(12) United States Patent
Lai

(10) Patent No.: US 10,048,405 B2
(45) Date of Patent: Aug. 14, 2018

(54) HYDROGEL-BASED CONTACT LENS AND METHODS OF MANUFACTURING THEREOF

(71) Applicant: FENG CHIA UNIVERSITY, Taichung (TW)

(72) Inventor: Chun-Feng Lai, Taichung (TW)

(73) Assignee: FENG CHIA UNIVERSITY, Taichung (TW)

( * ) Notice: Subject to any disclaimer, the term of this patent is extended or adjusted under 35 U.S.C. 154(b) by 120 days.

(21) Appl. No.: 15/158,581

(22) Filed: May 18, 2016

(65) Prior Publication Data

US 2017/0227680 A1    Aug. 10, 2017

(30) Foreign Application Priority Data

Feb. 5, 2016   (TW) .............................. 105104079 A

(51) Int. Cl.
| | | |
|---|---|---|
| *G02B 1/04* | (2006.01) | |
| *G02C 7/04* | (2006.01) | |
| *G02C 7/10* | (2006.01) | |

(52) U.S. Cl.
CPC .............. *G02B 1/043* (2013.01); *G02C 7/04* (2013.01); *G02C 7/049* (2013.01); *G02C 7/10* (2013.01); *G02C 7/104* (2013.01)

(58) Field of Classification Search
CPC ........ G02C 7/049; G02C 7/085; G02C 7/104; G02C 7/04; G02B 1/043; G02B 1/06
USPC ....................................................... 264/1.34
See application file for complete search history.

(56) References Cited

U.S. PATENT DOCUMENTS

| | | | | |
|---|---|---|---|---|
| 5,314,960 | A * | 5/1994 | Spinelli ................. | C08F 287/00 525/280 |
| 6,420,453 | B1 * | 7/2002 | Bowers ................... | C07F 9/091 523/106 |
| 2002/0005933 | A1 * | 1/2002 | Imafuku ............... | C08F 283/12 351/159.03 |
| 2004/0241207 | A1 * | 12/2004 | Chauhan .............. | A61K 9/0048 424/429 |
| 2010/0113901 | A1 * | 5/2010 | Zhang ................ | A61B 5/14532 600/319 |
| 2014/0171541 | A1 * | 6/2014 | Scales ..................... | C08L 33/04 523/107 |

(Continued)

FOREIGN PATENT DOCUMENTS

| | | |
|---|---|---|
| TW | 201302244 A1 | 1/2013 |
| TW | 201531734 A | 8/2015 |

OTHER PUBLICATIONS

Chun-Feng Lai, Yu-Chi Wang, Hsiang-Chih Hsu, "High Transparency in the Structural Color Resin Films through Quasi-Amorphous Arrays of Colloidal Silica Nanospheres", Journal of Materials Chemistry C, Dec. 3, 2015, pp. 398-406, vol. 4, The Royal Society of Chemistry.

*Primary Examiner* — Jordan Schwartz
(74) *Attorney, Agent, or Firm* — Cheng-Ju Chiang

(57) ABSTRACT

Composite hydrogel films for contact lenses and the methods of manufacturing are provided. The composite hydrogel films are formed by the following steps of: mixing a hydrogel precursor with nanospheres dispersed in a colloid; evaporating the solvent in the mixture; curing the hydrogel to form a composite hydrogel film having nanospheres arranged in amorphous arrays. The composite hydrogel films selectively reflect light in hazardous wavelengths.

15 Claims, 5 Drawing Sheets

(56) References Cited

U.S. PATENT DOCUMENTS

| | | | |
|---|---|---|---|
| 2015/0168616 A1* | 6/2015 | Blair | G02B 5/008 359/885 |
| 2017/0165112 A1* | 6/2017 | Stankus | A61F 9/0017 |

* cited by examiner

HYDROGEL-BASED CONTACT LENS AND METHODS OF MANUFACTURING THEREOF

CROSS-REFERENCE TO RELATED APPLICATION AND CLAIM OF PRIORITY

This application claims the benefit of Taiwan Patent Application No. 105104079, filed on Feb. 5, 2016, in the Taiwan Intellectual Property Office, the disclosure of which is incorporated herein in its entirety by reference.

TECHNICAL FIELD

At least one embodiment of the present invention relates to a hydrogel-based contact lens, which selectively reflects light in some wavelengths. More particularly, a hydrogel-based contact lens made of transparent hydrogel and nanospheres.

DESCRIPTION OF THE RELATED ART

In the contact lens industry, the most common methods to reduce the levels of ultraviolet (UV) light and blue light incoming to eyes are by introducing UV absorbers or yellow dyes to the contact lenses. However, the concentrations of absorbers and dyes are limited to a certain level. As a result, commercial contact lenses are able to screen out only 20% of the blue light, which do not meet the market demand.

SUMMARY

At least one embodiment of the present invention relates to hydrogel-based contact lenses and the methods of manufacturing thereof. The hydrogel-based contact lenses comprise composite hydrogel films having a transparent hydrogel and nanospheres arranged in amorphous arrays. The composite hydrogel films therefore are able to selectively reflect light in some wavelengths.

Modifications to the diameter of the nanospheres, as well as the concentration of nanospheres in the composite hydrogel film, would change the transmittance and reflectance for incident light. A hydrogel-based contact lens made from the methods and the composite hydrogel film having a thickness of 0.010-0.50 mm exhibits properties including high transmittance and wavelength-specific reflectance.

At least one embodiment of the present invention relates to methods of manufacturing hydrogel-based contact lenses. In the methods, composite hydrogel films are cured by evaporating solvents in a mixture of a hydrogel precursor and nanospheres dispersed in a colloid. In the composite hydrogel films, the nanospheres are arranged in amorphous arrays.

The hydrogel-based contact lenses show high reflectance for light in some wavelengths if the thickness of the composite hydrogel films is made between 0.010-0.50 mm and the diameter of the nanospheres is between 10-1000 nm, in accordance with the method in some embodiments. For example, a composite hydrogel film may exhibit high transmittance for visible light but low transmittance for ultraviolet (UV) light if the nanospheres are made in proper diameters and arranged in amorphous arrays. This composite hydrogel film with high reflectance to ultraviolet light can be used to screen out hazardous wavelengths while having high transparency.

Accordingly, at least one embodiment of the present invention may be applied to fields where the hydrogel products with high transparency but strong reflectance to some specific wavelengths are in need; for example, the contact lens industry. At least one embodiment of the present invention may be used to replace the conventional contact lenses mixed with hydrogel and UV absorbers or dyes. The embodiments show strong benefits to the contact lens industry, since the embodiments provide low-cost hydrogel films with the ability to protect eyes from hazardous wavelengths while maintaining their safety.

DESCRIPTION OF THE PREFERRED EMBODIMENTS

Figure 1:
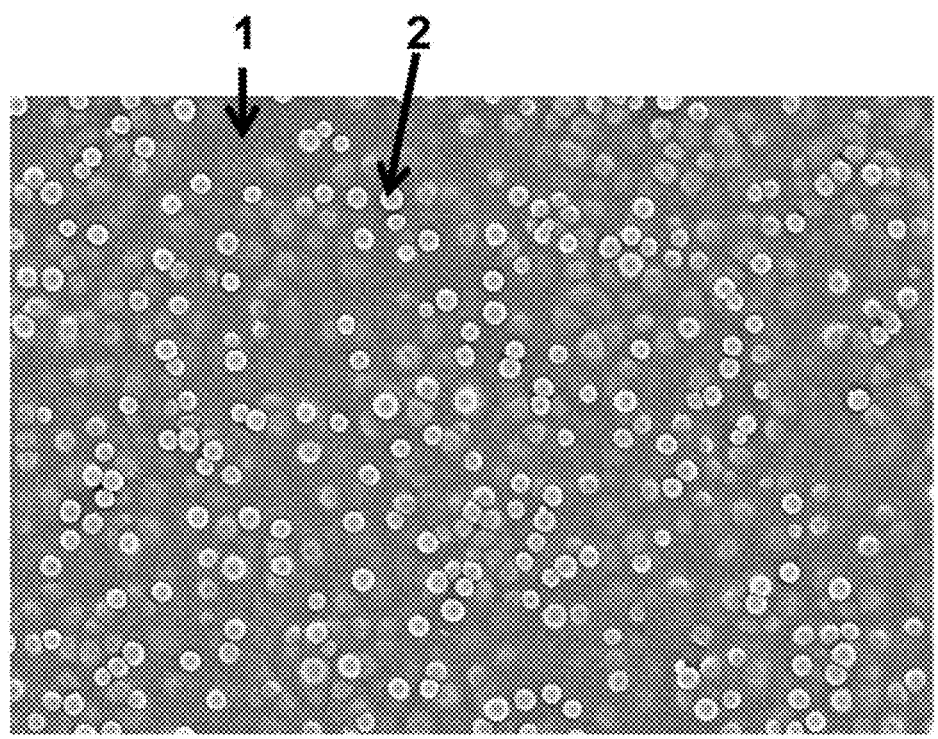
FIG. 1 is an image illustrating the structure of a composite hydrogel film, in accordance with some embodiments of the present invention.

The examples depicted in the following section are provided for the purpose of detailed explanation of the features of preferred embodiments, in order to enable one having ordinary skill in the art to understand the preferred embodiments.

At least one embodiment of the present invention relates to hydrogel-based contact lenses and the methods of manufacturing thereof. In the methods, composite hydrogel films are cured by evaporating solvents in a mixture of a hydrogel precursor and nanospheres dispersed in a colloid. In the composite hydrogel films, the nanospheres are arranged in amorphous arrays.

In the methods of manufacturing hydrogel-based contact lenses, the hydrogel precursor may be photocurable hydrogel, thermalcurable hydrogel, or the combination thereof. The compositions and curing processes may be differed based on the properties of selected hydrogel.

The photocurable hydrogel is polymerized from hydrogel precursor, photoinitiator, and ultraviolet (UV) light. Under the exposure of UV light (i.e., wavelengths ranging from 200 nm to 400 nm), electrons of the photoinitiator absorb the UV radiation and jump to higher energy excited states to generate active regions in a short time. The active regions interact with the unsaturated groups of the monomers and break the double bonds between monomers and/or crosslinking agents for free radical polymerization. The ratio between monomers, crosslinking agents, and diluting agents may be modified based on design considerations, such as based on the intended viscosity of the films.

In some embodiments, the nanospheres used in composite hydrogel films are made of one selected from the group consisting of silica ($SiO_2$), polystyrene (PS), poly(methyl methacrylate) (PMMA), poly(styrene-methyl methacrylate-acrylic acid) (P(St-MMA-AA)), poly(styrene-acrylic acid) (P(St-AA)), and the combination thereof. Each nanosphere may have a diameter of 10-1000 nm.

The nanospheres may be prepared in several methods, before the transparent hydrogel is cured into films. For example, nanospheres may be made from the sedimentation process or Stöber-Fink-Bohn method. The sedimentary products of sodium silicate ($Na_2O \cdot nSiO_2$) and inorganic acids (e.g., sulfuric acid) under a neutral environment are used as nanospheres in some embodiments using the sedimentation process. The products of silicon alkoxides solved in alcohols (e.g., methanol or ethanol) and catalyzed by ammonia under sonication are used as nanospheres in some embodiments using the Stöber-Fink-Bohn method. Processes based on wet chemistry such as hydrothermal processes, spray pyrolysis, electrochemical processes may be used to prepare the nanospheres in some other embodiments. However, the nanospheres in the present embodiments are made with the Stöber-Fink-Bohn method.

The hydrogel precursor and the nanospheres are evenly mixed by a disperser, a homogenizer, a sonication device, a bead mill, a ball mill, or a kneading device.

The solidification process is induced with photoinitiators if the hydrogel precursor is a photocurable resin. The photoinitiator may be one selected from the group consisting of acetophenone derivatives, α-hydroxy ketone derivatives, and benzophenone derivatives.

One example of acetophenone derived photoinitiator is 2,2-diethoxyacetophenone, (DEAP). The exemplary photoinitiators of α-Hydroxy ketone derivatives include 2-Hydroxy-2-methylphenylpropanone (HMPP), 1-Hydroxy-cyclohexyl-pheny-ketone (HCPK), and the combination thereof. On the other hand, the exemplary photoinitiators of benzophenone derivatives include 2,4,6-Trimethylbenzophenone (TMBP), 4-Methylbenzophenone (MBP), and the combination thereof.

The mixture of the hydrogel precursor and nanospheres in colloid is first mixed with a photoinitiator, and then removed the solvent (e.g., the methanol, ethanol, acetone, or toluene used to prepare nanospheres) from the mixture. The mixture is then applied onto a substrate surface by casting, blade coating, roller coating, spray coating, gravure coating, or curtain coating to form certain shapes. In some other embodiments, the mixture may be molded into certain structures with mold notches.

The mixture is then exposed to the radiation from UV LED lamps, high-pressure mercury vapour lamps, electrodeless lamps, or xenon lamps for a period ranging from 2 seconds to 20 minutes to form the composite hydrogel films. The exposure is performed under an illuminance of 5-200 mW/cm$^2$ or an amount of UV radiation of 4-2000 mJ/cm$^2$.

However, the photoinitiators and radiation exposure are not required if the hydrogel precursor is a thermalcurable resin. The applied mixture or molded mixture is directly sent to an oven for heating at 100-160° C. for 1-300 minutes to form the composite hydrogel films. In some embodiments, the mixture is further sent to a second solidification process to be heated in the oven at 150° C. for 4 hours. In some other embodiments, the mixture is solidified by being mixed with hardeners under room temperature.

Figure 2:
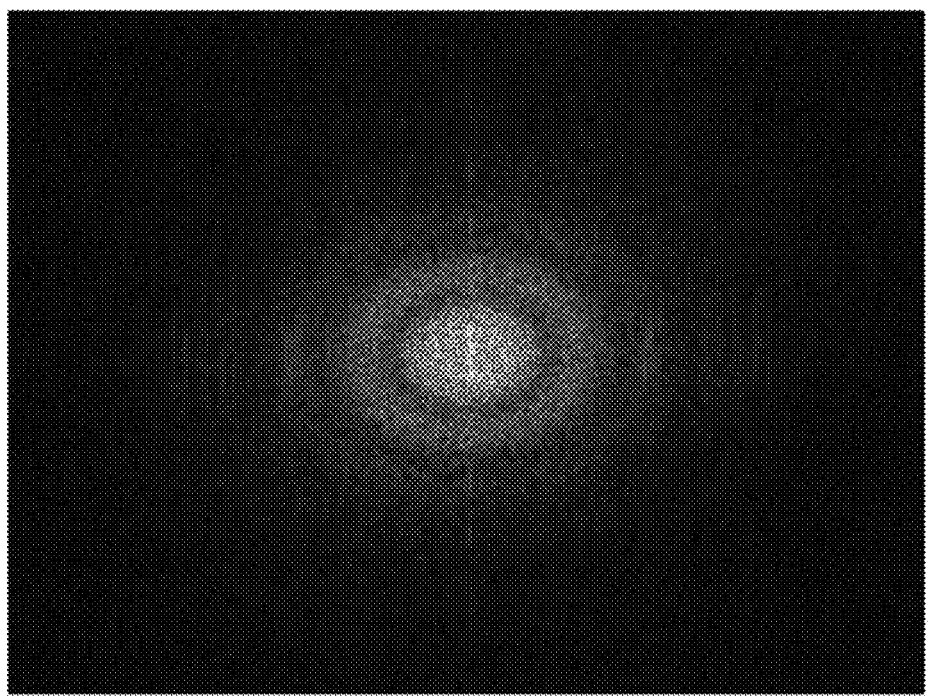
FIG. 2 is an image illustrating the structure of a composite hydrogel film after the Fourier transform, in accordance with some embodiments of the present invention.

FIG. 1 and FIG. 2 illustrate the structures of composite hydrogel films. FIG. 1 is an image illustrating the structure of a composite hydrogel film, in accordance with some embodiments of the present invention. In FIG. 1, the arrangement of nanospheres is disclosed after the hydrogel covering on the nanospheres were removed by plasma etchers. Under an electron microscopy, the nanospheres 2 in the transparent hydrogel 1 are in non-periodic arrangement. The random structure in similar to amorphous arrays. More particularly, the nanospheres 2 in FIG. 1 have heterogeneous diameters. The differences in diameter may be up to 20-40 nm. Accordingly, the nanospheres 2 are arranged in amorphous arrays.

FIG. 2 is an image illustrating the structure of a composite hydrogel film after the Fourier transform, in accordance with some embodiments of the present invention. The fast Fourier transformation image shows a circular ring pattern, suggesting an isotopic, short-range ordered but long-range amorphous structure. That is, the internal arrangement of the composite hydrogel film is an amorphous structure.

Figure 3:
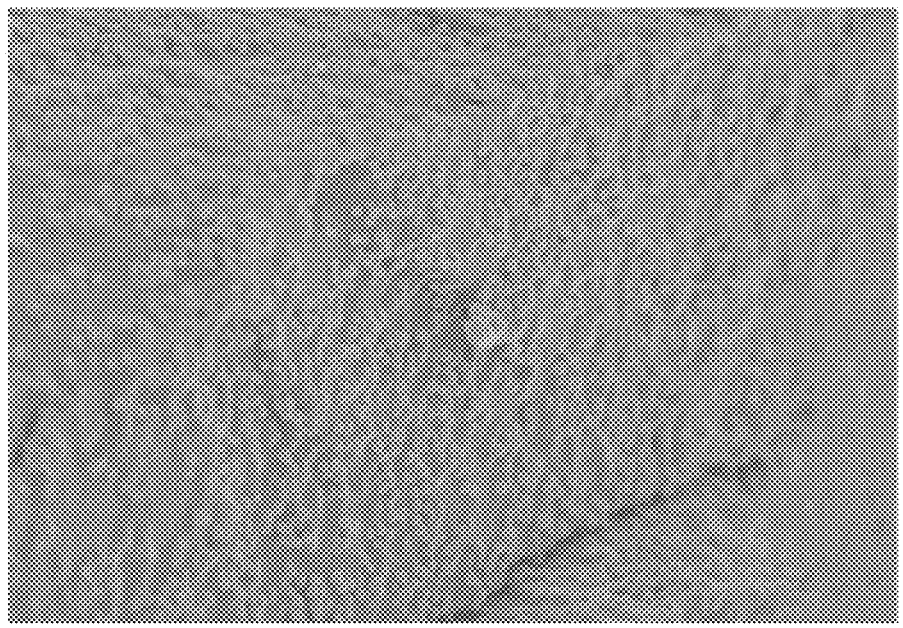
FIG. 3 is a cross-sectional view of a composite hydrogel film, in accordance with some embodiments of the present invention.

FIG. 3 is a cross-sectional view of a composite hydrogel film, in accordance with some embodiments of the present invention. FIG. 3 indicates that the nanospheres are fully mixed with hydrogel and no phase separation induced by covalent bonds is observed in the composite hydrogel film.

According to constructive interference and Rayleigh scattering, a composite hydrogel film may have high transparency while reflect light in specific wavelengths based on the concentration of nanospheres and the selection of diameters for nanospheres. That is mainly premised on the scattering of specific wavelengths by particles and the combination of light waves.

In some embodiments, the methods of manufacturing composite hydrogel films are used to manufacture contact lenses. The materials for the composite hydrogel films may include photocurable hydrogel or thermalcurable hydrogel.

In the embodiments using photocurable hydrogel, the hydrogel precursor comprises a monomer, a crosslinking agent, and an initiator. More particularly, the monomer is 2-hydroxyethylmethacrylate (HEMA), the crosslinking agent is ethylene glycol dimethacrylate (EGDMA), and the initiator is 2-hydroxy-2-methyl-1-phenyl-1-propanone (HMPP).

In the embodiments using thermalcurable hydrogel, the hydrogel precursor comprises a monomer, a crosslinking agent, and an initiator. The monomer is HEMA, N-vinylpyrrolidone (NVP), or KH-570 (2-hydroxyethylmethacrylate, N-vinyl-2-pyrrolidone, and 3-methacryloxypropyltrimethoxysilane). The crosslinking agent is N,N'-methylenebisacrylamide (NMBA). And the initiator is azobisisobutyronitrile (AIBN).

The nanospheres are made of one selected from the group consisting of silica, polystyrene, poly(methyl methacrylate), poly(styrene-methyl methacrylate-acrylic acid) (P(St-MMA-AA)), poly(styrene-acrylic acid) (P(St-AA)), and the combination thereof. The composite hydrogel film comprises 10-50 wt % of nanospheres. For example, the nanospheres may be 18, 20, 33, or 50 wt % in the mixture of nanospheres and transparent hydrogel. The diameter of nanospheres is between 10 to 1000 nm. For example, the diameter may be in the 90 nm, 100 nm, 120 nm, 150 nm, 200 nm, or 300 nm±40 nm ranges. More particularly, the polydispersity index (PDI) of the nanospheres is greater than 0.05 PDI.

Figure 4:
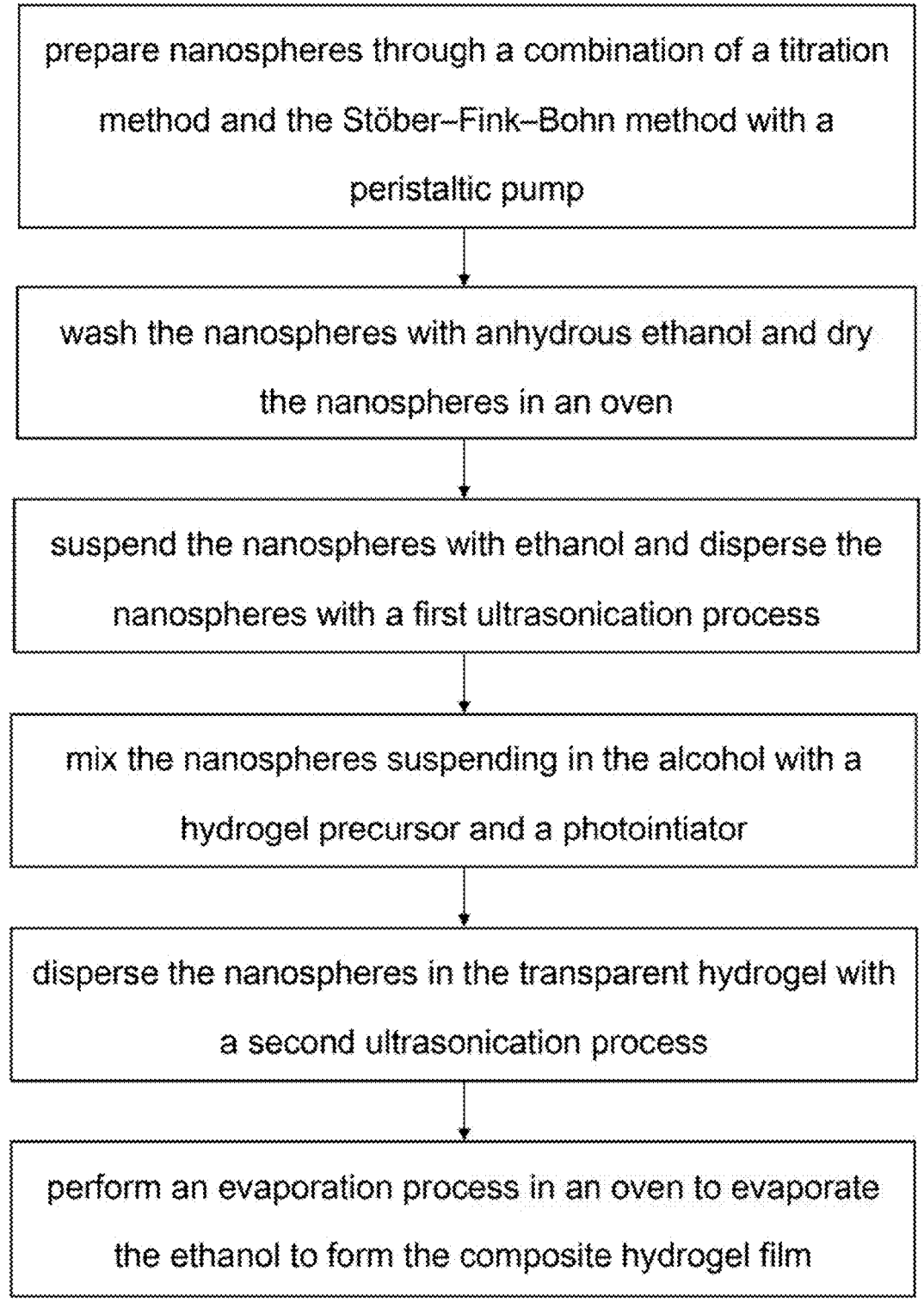
FIG. 4 is a flowchart of the method of manufacturing composite hydrogel films, in accordance with some embodiments of the present invention.

FIG. 4 is a flowchart of the method of manufacturing composite hydrogel films, in accordance with some embodiments of the present invention. The method comprises steps of: (S1) preparing nanospheres through a combination of a titration method and the Stöber-Fink-Bohn method with a peristaltic pump; (S2) washing the nanospheres with anhydrous ethanol, and drying the multiple nanospheres in an oven after a centrifugation process; (S3) suspending the nanospheres with ethanol and dispersing the multiple nanospheres with a first ultrasonication process; (S4) mixing the nanospheres suspending in the ethanol with a hydrogel precursor and a photoinitiator for the transparent hydrogel; (S5) dispersing the nanospheres in the transparent hydrogel with a second ultrasonication process; and (S6) performing an evaporation process in an oven to evaporate the ethanol to form the composite hydrogel film.

The centrifugation process is performed at 5000 rpm for 0.5 hour. The first ultrasonication process is performed at 1200 W for 8 hours, while the second ultrasonication process is performed at 1200 W for 4 hours. And the evaporation process is performed at 70° C. for 12 hours.

Figure 5:
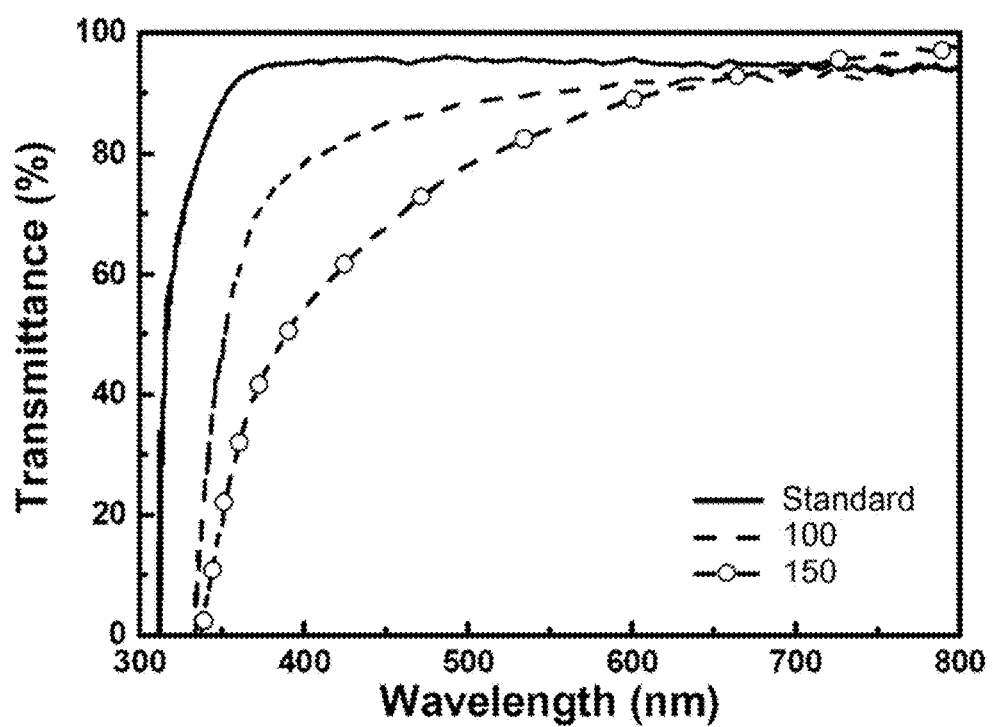
FIG. 5 is the transmittance spectra for contact lenses with nanospheres in difference diameters, in accordance with some embodiments of the present invention.

FIG. 5 is the transmittance spectra for contact lenses with nanospheres in difference diameters, in accordance with some embodiments of the present invention. The contact lenses with nanospheres in different diameters are exposed to light in different wavelengths. The standard film in FIG. 5 is a hydrogel film made of transparent hydrogel without nanospheres; the 100 film is a composite hydrogel film made of transparent hydrogel and nanospheres with a diameter of 100 nm; and the 150 film is a composite hydrogel film made of transparent hydrogel and nanospheres with a diameter of 150 nm.

The chart below is a conversion from FIG. 5. In the chart, transmittance is denoted as "T (%)", UV light is denoted as "UV-A", and the blue light is denoted as "Blue".

| T(%) | UV-A (316-380 nm) | Blue (400-460 nm) |
|---|---|---|
| Standard Film | 95% | 95% |
| 100 Film | 73% | 85% |
| 150 Film | 45% | 68% |

According to the chart, the transmittance of the standard film, a hydrogel film without nanospheres, for UV light and the blue light is up to 95%. The transmittance of the 100 film, a composite hydrogel film containing nanospheres with a diameter of 100 nm, for UV light and the blue light shows 20% and 10% decreases respectively as compared to the standard film. The transmittance of the 150 film, a composite hydrogel film containing nanospheres with a diameter of 150 nm, for UV light and the blue light shows 50% and 27% decreases respectively as compared to the standard film.

The standard film, 100 film, and 150 film in FIG. 5 show different transmission colors under white LED. The incident light from the white LED pass through the standard film without blue light being filtered. The 100 film and 150 film, however, demonstrate different abilities to filter blue light in accordance with the diameters of the nanospheres therein. Accordingly, the standard film is clear and transparent if observed from the opposite side to the incident light, while the 100 film and 150 file are in light yellow and deep yellow respectively.

Similarly, the standard film, 100 film, and 150 film in FIG. 5 show different reflection colors under white LED. The incident light from the white LED pass through the standard film without blue light being reflected. The 100 film and 150 film, however, demonstrate different abilities to reflect blue light in accordance with the diameters of the nanospheres therein. Accordingly, the standard film is clear and transparent if observed from the same side to the incident light, while the 100 film and 150 file are in light blue and deep blue respectively.

The composite hydrogel films for contact lenses in some of the embodiments are used to control the incident amount of light in hazardous wavelengths. Anti-blue light contact lenses may be produced in accordance with the market demand. The embodiments also disclose methods of manufacturing contact lenses, which show strong benefits and improvement to the contact lens industry.

There are many inventions described and illustrated above. The present inventions are neither limited to any single aspect nor embodiment thereof, nor to any combinations and/or permutations of such aspects and/or embodiments. Moreover, each of the aspects of the present inventions, and/or embodiments thereof, may be employed alone or in combination with one or more of the other aspects of the present inventions and/or embodiments thereof. For the sake of brevity, many of those permutations and combinations will not be discussed separately herein.

What is claimed is:

1. A contact lens, comprising:
    a composite hydrogel film, wherein the composite hydrogel film is a transparent hydrogel, wherein the composite hydrogel film having a thickness between 0.010-0.50 mm; and
    nanospheres in the transparent hydrogel, wherein the nanospheres are arranged amorphously and each nanosphere has a diameter between 10-1000 nm;
    wherein the nanospheres have heterogeneous diameters, the difference in the diameters ranges from 20 to 40 nm.

2. The contact lens as claimed in claim 1, wherein the diameter of each nanosphere is between 100-300 nm.

3. The contact lens as claimed in claim 1, wherein the diameter of each nanosphere is between 100-150 nm.

4. The contact lens as claimed in claim 1, wherein the nanospheres are made of one selected from the group consisting of silica, polystyrene, poly(methyl methacrylate), poly(styrene-methyl methacrylate-acrylic acid), poly(styrene-acrylic acid), and the combination thereof.

5. The contact lens as claimed in claim 1, wherein composite hydrogel film comprises 10-50 wt % of the nanospheres.

6. The contact lens as claimed in claim 1, wherein the polydispersity index (PDI) of the nanospheres is greater than 0.05 PDI.

7. A method of manufacturing the contact lens claimed in claim 1, comprising steps of:
    (S1) preparing nanospheres through a combination of a titration method and the Stöber-Fink-Bohn method with a peristaltic pump;
    (S2) washing the nanospheres with anhydrous ethanol, and drying the nanospheres in an oven after a centrifugation process;
    (S3) suspending the nanospheres with ethanol and dispersing the nanospheres with a first ultrasonication process;
    (S4) mixing the nanospheres suspending in the ethanol with a hydrogel precursor and a photoinitiator for the transparent hydrogel;
    (S5) dispersing the nanospheres in the transparent hydrogel with a second ultrasonication process; and
    (S6) performing an evaporation process in an oven to evaporate the ethanol to form the composite hydrogel film.

8. The method as claimed in claim 7, wherein the centrifugation process is performed at 5000 rpm for 0.5 hour.

9. The method as claimed in claim 7, wherein the first ultrasonication process is performed at 1200 W for 8 hours.

10. The method as claimed in claim 7, wherein the second ultrasonication process is performed at 1200 W for 4 hours.

11. The method as claimed in claim 7, wherein the evaporation process is performed at 70° C. for 12 hours.

12. The method as claimed in claim 7, wherein the hydrogel precursor comprises a monomer and a crosslinking agent, and wherein the monomer is 2-hydroxyethylmethacrylate and the crosslinking agent is ethylene dimethacrylate.

13. The method as claimed in claim 12, wherein the photoinitiator is 2-hydroxy-2-methyl-1-phenyl-1-propanone.

14. The method as claimed in claim 7, wherein the hydrogel precursor comprises a monomer and a crosslinking agent, and wherein the monomer is 2-hydroxyethylmethacrylate, N-vinylpyrrolidone, or KH-570, and wherein the crosslinking agent is N,N'-methylenebisacrylamide.

15. The method as claimed in claim 7, wherein the photoinitiator is azobisisobutyronitrile.

* * * * *